(12) United States Patent
Wang et al.

(10) Patent No.: US 9,979,299 B2
(45) Date of Patent: May 22, 2018

(54) POWER CONVERTER DAMAGE PROTECTION

(71) Applicant: Infineon Technologies Austria AG, Villach (AT)

(72) Inventors: Zan Wang, Singapore (SG); Wee Tar Richard Ng, Singapore (SG); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days. days.

(21) Appl. No.: 15/286,101

(22) Filed: Oct. 5, 2016

(65) Prior Publication Data

US 2018/0097446 A1   Apr. 5, 2018

(51) Int. Cl.
| | |
|---|---|
| *H02M 3/156* | (2006.01) |
| *H02M 1/36* | (2007.01) |
| *H02M 3/335* | (2006.01) |
| *H02M 1/08* | (2006.01) |
| *H02M 1/32* | (2007.01) |
| *H02M 1/00* | (2006.01) |

(52) U.S. Cl.
CPC ......... *H02M 3/33507* (2013.01); *H02M 1/08* (2013.01); *H02M 1/32* (2013.01); *H02M 1/36* (2013.01); *H02M 2001/0009* (2013.01)

(58) Field of Classification Search
CPC .......... H02M 2001/0009; H02M 1/36; H02M 3/335; H02M 3/156
See application file for complete search history.

(56) References Cited

U.S. PATENT DOCUMENTS 9,166,486 B2 * 10/2015 Matthews ......... H02M 3/33523

* cited by examiner

*Primary Examiner* — Gary L Laxton
(74) *Attorney, Agent, or Firm* — Shumaker & Sieffert, P.A.

(57) ABSTRACT

In one example, a method includes activating, by a controller of a power converter, a switch of the power converter that controls an amount of energy provided by the power converter; receiving, by an input of the controller, a signal that represents an amount of current flowing through the switch; responsive to determining that the amount of current flowing through the switch is greater than or equal to a threshold amount of current, deactivating, by the controller, the switch; and responsive to determining that an amount of time elapsed since activation of the switch is greater than a threshold amount of time, deactivating, by the controller, the switch.

18 Claims, 6 Drawing Sheets

FIG. 6

POWER CONVERTER DAMAGE PROTECTION

TECHNICAL FIELD

This disclosure relates to power converters, and in particular, to techniques for preventing damage to power converters.

BACKGROUND

A typical switched mode power converter, also known as a switched mode power supply, includes a controller and a switch. The controller may operate the switch to control how much energy is provided by the switched mode power converter. One example of a switched mode power converter is a flyback converter. A typical flyback converter includes a primary side circuit, a transformer, and a secondary side circuit. The primary side circuit is connected to a power source and includes at least one switching element that controls the amount of energy transferred to the secondary side via the transformer. The transformer serves as an electrically isolated channel to transfer energy from the primary side circuit to the secondary side circuit. The secondary side circuit is coupled to a load to be powered. Other examples of switched mode power converters include buck, boost, buck-boost, forward, push-pull, half-bridge, full-bridge, Cuk, single-ended primary inductor converter (SEPIC), and double-ended forward.

SUMMARY

In one example, a method includes activating, by a controller of a power converter, a switch of the power converter that controls an amount of energy provided by the power converter; receiving, by an input of the controller, a signal that represents an amount of current flowing through the switch; responsive to determining that the amount of current flowing through the switch is greater than or equal to a threshold amount of current, deactivating, by the controller, the switch; and responsive to determining that an amount of time elapsed since activation of the switch is greater than a threshold amount of time, deactivating, by the controller, the switch.

In another example, a device for controlling a power converter includes: an output connector configured to output a signal to control activation of a switch of the power converter, wherein the switch controls an amount of energy provided by the power converter; an input configured to receive a signal that represents an amount of current flowing through the switch; and one or more processors. In this example, the one or more processors are configured to: output, via the output connector, a signal to activate the switch; determine, based on the signal received by the input connector, an amount of current flowing through the switch; responsive to determining that the amount of current flowing through the switch is greater than or equal to a threshold amount of current, output, via the output connector, a signal to deactivate the switch; and responsive to determining that an amount of time elapsed since activation of the switch is greater than a threshold amount of time, output, via the output connector, a signal to deactivate the switch.

In another example, a device for controlling a power converter includes: means for activating a switch of a power converter that controls an amount of energy provided by the power converter; means for receiving a signal that represents an amount of current flowing through the switch; means for deactivating the switch in response to determining that the amount of current flowing through the switch is greater than or equal to a threshold amount of current; and means for deactivating the switch in response to determining that an amount of time elapsed since activation of the switch is greater than a threshold amount of time.

The details of one or more examples of the invention are set forth in the accompanying drawings and the description below. Other features, objects, and advantages of the invention will be apparent from the description and drawings, and from the claims.

DETAILED DESCRIPTION

A typical flyback converter includes a primary side circuit, a transformer, and a secondary side circuit. The primary side circuit is connected to a power source such as a power grid, battery, or other source of power, and includes at least one switching element that controls the amount of energy transferred to the secondary side via the transformer. The transformer serves as an electrically isolated channel to transfer energy from the primary side circuit to the secondary side circuit, thus, maintaining galvanic isolation between the primary side and the secondary side. The secondary side circuit is coupled to a load to be powered, in some cases via an output capacitor.

The primary side circuit further includes a driver circuit that drives the primary side switching element. The driver circuit switches the primary side switching element on and off in order to transfer energy from the power source to the secondary side circuit via the transformer. In operation, the driver circuit may activate (i.e., turn on) the primary side switching element to transfer energy to the transformer. This energy may be stored as a magnetic flux in an air gap of the transformer, between primary and secondary windings of the transformer. The driver circuit may then deactivate (i.e., turn off) the primary side switching element, which may cause the energy stored in the transformer to be transferred to the secondary side circuit and the load.

The driver circuit may control activation of the primary side switching element based at least in part on amount of current flowing through the primary side switching element. For instance, the driver circuit may activate the primary side switching element to transfer energy to the transformer, monitor the amount of current flowing through the primary side switching element while the energy is being transferred, and deactivate the primary side switching element once the amount of current flowing through the primary side switching element is greater than or equal to a threshold amount of current.

Some driver circuits may be configured to operate flyback power converters in a plurality of modes, such as a soft-start mode and a normal regulation mode. In the soft-start mode, a driver circuit may gradually increase the switch-current limit (i.e., the threshold amount of current on-which activation of the primary side switching element is based) in order to slow the rate of rise of the output voltage and reducing the peak current required when starting up. A driver circuit may initially operate a flyback power converter in the soft-start mode, and transition into operating the flyback power converter in the normal regulation mode after a period of time (e.g., 100 microseconds to 3 milliseconds). In the normal regulation mode, a driver circuit may use a switch-current limit selected based on normal operating parameters (e.g., to control output current and/or voltage levels).

In some situations, as a result of any number of reasons, the driver circuit may not be able to accurately monitor the amount of current flowing through the primary side switching element. For instance, a connector of the driver circuit used to monitor the amount of current flowing through the primary side switching element may be shorted (e.g., during a soldering process). Without being able to accurately monitor the amount of current flowing through the primary side switching element, the driver circuit may fail to deactivate the primary side switching element even though the amount of current flowing through the primary side switching element is greater than the threshold amount of current. The failure to deactivate the primary side switching element may result in a large amount of current passing through the primary side switching element and cause permanent damage to the primary side switching element. Similarly, the failure to deactivate the primary side switching element may result in a large amount of energy being transferred to the secondary side components, which may cause damage to the secondary side components.

In accordance with one or more techniques of this disclosure, a driver circuit of a power converter may be configured to deactivate a primary side switching element of the power converter in response to determining that the driver circuit is not able to accurately monitor the amount of current flowing through the primary side switching element. For instance, the driver circuit may receive, via an input connector (e.g., a current sense (CS) pin), a signal that represents an amount of current flowing through a switch (i.e., a primary side switching element). The driver circuit may compare a voltage level of the input connector (e.g., a potential of the input connector) with a voltage threshold and determine that it is not able to accurately monitor the amount of current flowing through the switch in response to the voltage level of the input connector remaining lower than the voltage threshold for a threshold amount of time. In response to determining that it is not able to accurately monitor the amount of current flowing through the switch, the driver circuit may deactivate the switch. In this way, the driver circuit may protect the switch and/or other components from damage, which may reduce the risk of fires. As such, the driver circuit may increase the safety of the power converter.

However, in some examples, it may not be desirable for the driver circuit to determine whether it is able to accurately monitor the amount of current flowing through the switch in response to the voltage level of the input connector remaining lower than the voltage threshold for the threshold amount of time. As one example, a designer of such a driver circuit has to expend additional effort to ensure that the voltage threshold is not too low during soft-start and normal regulation or else the driver circuit could falsely determine that it cannot accurately monitor the amount of current flowing through the switch due to incorrect system component dimensioning. As another example, the driver circuit could falsely determine that it cannot accurately monitor the amount of current flowing through the switch due to inaccurate sensing of the voltage level of the input connector, such as due to noise on the input connector. The input connector could be noisy as a result of fast switching of the switch, especially in the case of hard switching and during continuous conduction mode (CCM).

In some examples, a driver circuit may overcome one or more of the above disadvantages (i.e., false triggering due to a low voltage threshold or inaccurate voltage level sensing) through the use lower voltage thresholds and longer detection times. However, lowering the voltage threshold and/or increasing the detection times may reduce the effectiveness of the safety protection gained by deactivating the switch.

In accordance with one or more techniques of this disclosure, a driver circuit may be configured to determine that it is not able to accurately monitor the amount of current flowing through a switch based the switch being activated for longer than expected. For instance, in the case of a flyback power converter, the driver circuit may activate a primary side switching element to transfer energy to the transformer, and monitor the amount of current flowing through the primary side switching element. As discussed above, if the amount of current flowing through the primary side switching element meets or exceeds the current threshold, the driver circuit may deactivate the primary side switching element, which may cause the energy stored in the transformer to be transferred to the secondary side circuit and the load. However, if an amount of time for-which the primary side switching element has been activated is greater than a threshold amount of time, the driver circuit may determine that it is not able to accurately monitor the amount of current flowing through a primary side switching element and deactivate the primary side switching element. In this way, the driver circuit may protect the primary side switching element and/or other components from damage, which may reduce the risk of fires.

While described below with respect to a flyback power converter, the techniques of this disclosure may also be used with other power converter typologies that utilize current mode control (i.e., that control activation of a switch based on a measured current, such as a current measured using a sense resistor). For instance, the techniques of this disclosure may be used with buck power converters, boost power converters, buck-boost power converters, forward power converters, push-pull power converters, half-bridge power converters, full-bridge power converters, Cuk power converters, single-ended primary inductor converters (SEPIC), and double-ended forward power converters.

Figure 1:
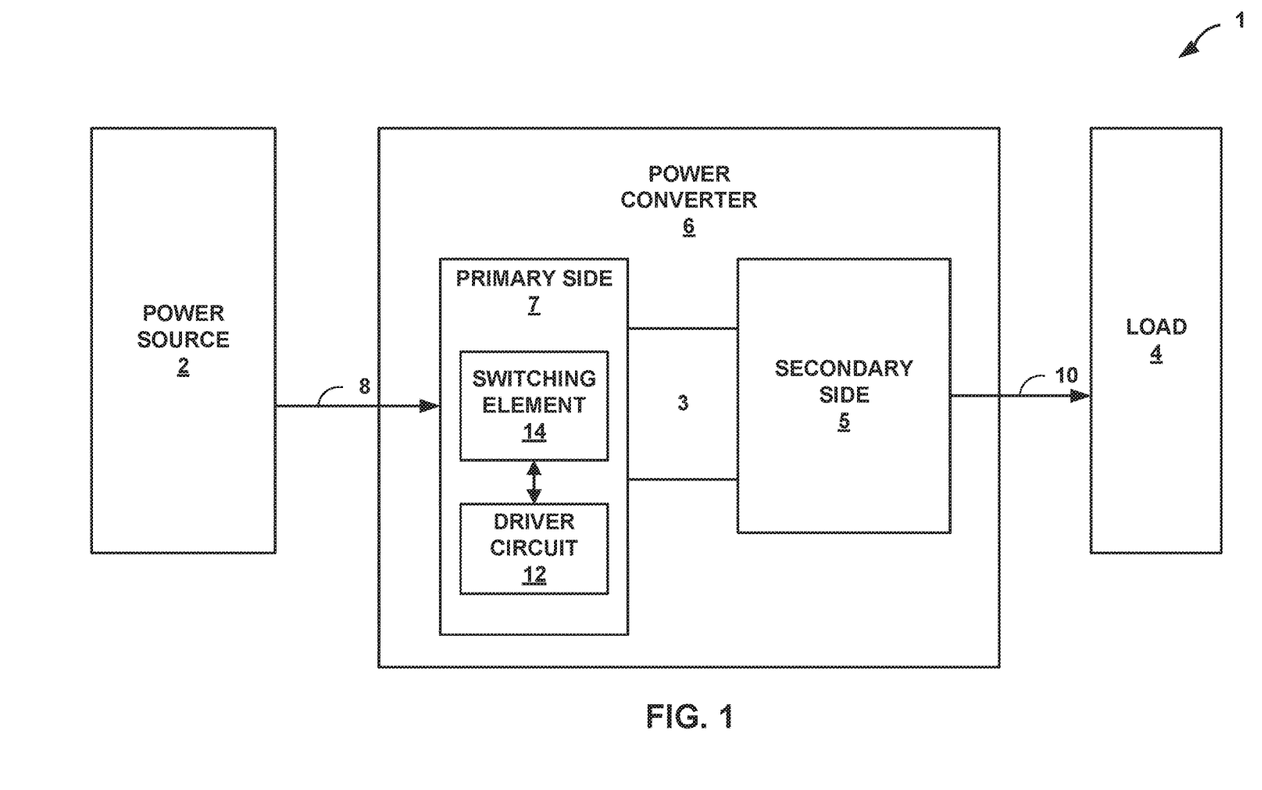
FIG. 1 is a conceptual diagram illustrating a system for converting power from a power source, in accordance with one or more aspects of the present disclosure.

FIG. 1 is a conceptual diagram illustrating system 1 for converting power from power source 2, in accordance with one or more aspects of the present disclosure. FIG. 1 shows system 1 as having four separate and distinct components shown as power source 2, power converter 6, and load 4, however system 1 may include additional or fewer components. For instance, power source 2, power converter 6, and load 4 may be four individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 6 which operates as a flyback converter that converts one form of electrical power provided by power source 2 into a different, and usable form, of electrical power for powering load 4. Power converter 6 is shown having primary side 7 separated by transformer 3 from secondary side 5. In some examples, transformer 3 may include more than one transformer or sets of transformer windings configured to transfer energy from source 2 to load 4. Using transformer 3 and the components of primary side 7 and secondary side 5, power converter 6 can convert the power input at link 8 into a power output at link 10.

Load 4 (also sometimes referred to herein as device 4) receives the electrical power converted by power converter 6. In some examples, load 4 may use electrical power from power converter 6 to perform a function.

Power source 2 may provide electrical power with a first voltage level and current level over link 8. Load 4 may receive electrical power that has a second voltage and current level, converted by power converter 6 over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10. Load 4 may receive the converted power that has the second voltage level at link 10 and load 4 may use the converted power having the second voltage level to perform a function (e.g., power a microprocessor, charge a battery, etc.).

Power converter 6 may include driver circuit 12, which may control operation of power converter 6. For instance, driver circuit 12 may control operation of switching element 14 that is included in primary side 7. In particular, driver circuit 12 may switch switching element 14 on and off in order to transfer energy from power source 2 to secondary side 5 via transformer 3. In operation, driver circuit 12 may turn on switching element 14 to transfer energy to transformer 3. This energy may be stored as a magnetic flux in an air gap of transformer 3, between primary and secondary windings of transformer 3. Driver circuit 12 may then turn off switching element 12, which may cause the energy stored in transformer 3 to be transferred to secondary side 5 and load 4.

As discussed above, driver circuit 12 may control activation of switching element 14 based at least in part on amount of current flowing through switching element 14. For instance, driver circuit 12 may activate switching element 14 to transfer energy to transformer 3, monitor the amount of current flowing through switching element 14 while the energy is being transferred, and deactivate switching element 14 once the amount of current flowing through switching element 14 is greater than or equal to a threshold amount of current.

As also discussed above, it may not be desirable for switching element 14 to be activated where driver circuit 12 is not able to accurately monitor the amount of current flowing through switching element 14. For instance, without being able to accurately monitor the amount of current flowing through switching element 14, driver circuit 12 may fail to deactivate switching element 14 even though the amount of current flowing through switching element 14 is greater than the threshold amount of current. The failure to deactivate switching element 14 may result in damage to switching element 14, other components of primary side 7, and/or components of secondary side 5.

In operation, as described in more detail below with respect to the additional figures, driver circuit 12 may deactivate switching element 14 in response to determining that driver circuit 12 is not able to accurately monitor the amount of current flowing through switching element 14. In some examples, driver circuit 12 may determine that it is not able to accurately monitor the amount of current flowing through switching element 14 in response to switching element 14 being activated for longer than expected. In this way, driver circuit 12 may protect switching element 14 and/or other components of system 1 from damage, which may increase an operation life of the components and/or reduce the risk of fires.

Figure 2:
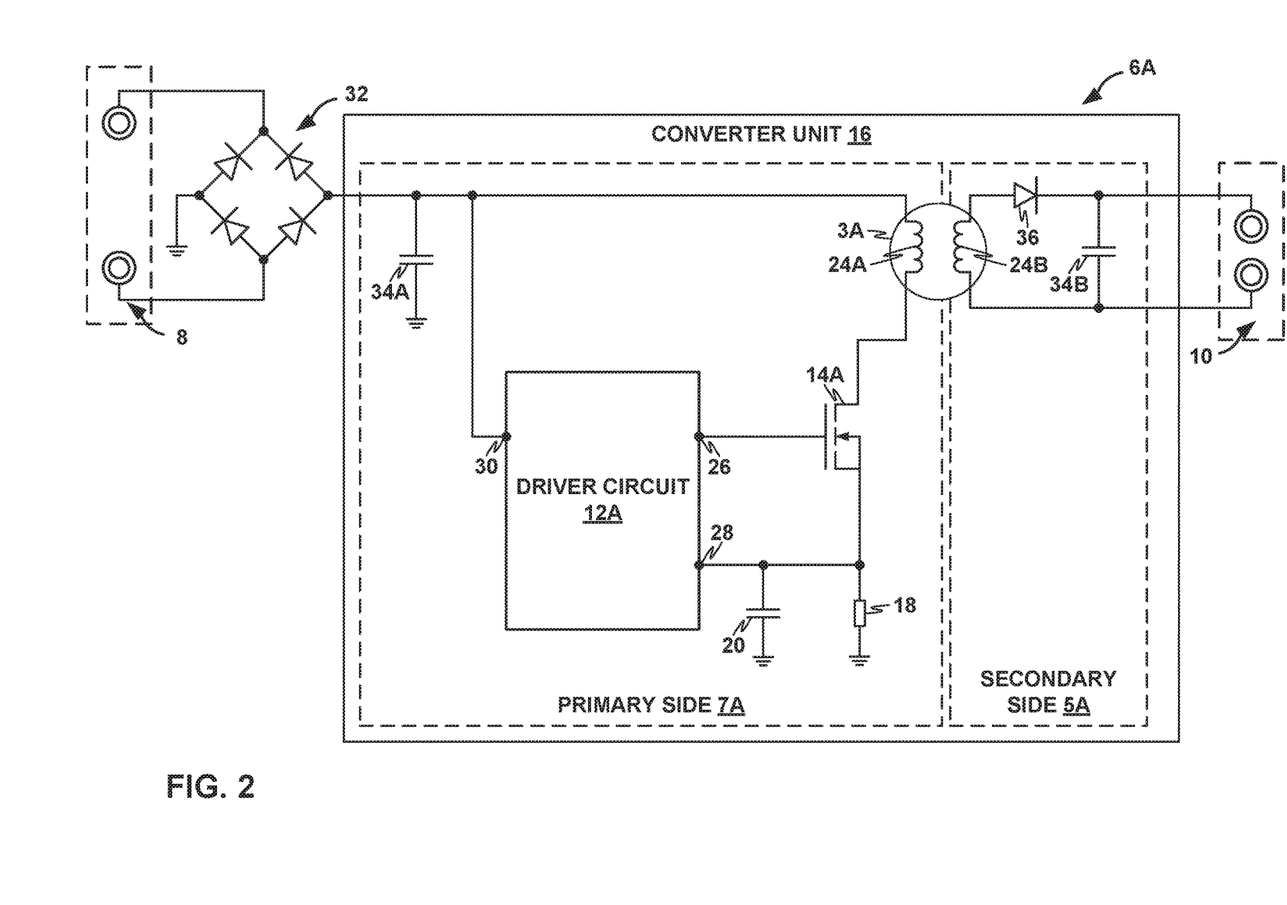
FIG. 2 is a conceptual diagram illustrating a power converter as one example of the power converter of the system shown in FIG. 1, in accordance with one or more aspects of the present disclosure.

FIG. 2 is a conceptual diagram illustrating power converter 6A as one example of power converter 6 of system 1 shown in FIG. 1. For instance, power converter 6A of FIG. 2 represents a more detailed exemplary view of power converter 6 of system 1 from FIG. 1 and the electrical connections to power source 2 and load 4 provided by links 8 and 10 respectively.

Power converter 6A may include two electrical components, e.g., driver circuit 12A and converter unit 16, that power converter 6A uses to convert electrical power received via link 8 and outputs at link 10. Power converter 6A may include more or fewer electrical components. For instance, in some examples, driver circuit 12A and converter unit 16 are a single electrical component or circuit while in other examples, more than two components and/or circuits provide power converter 6A with the functionality of driver circuit 12A and converter unit 16. In some examples, driver circuit 12A is contained within power converter 6A and in some examples, driver circuit 12A represents an external component associated with power converter 6A. In any event, whether an internal component or an external component, driver circuit 12A may communicate with converter unit 16 to cause power converter 6A to perform the techniques described herein for converting power from supply 2 and outputting the converter power to load 4.

Converter unit 16 may be referred to as a flyback converter and is described in more detail below. In general, converter unit 16 includes transformer 3A for providing electrically isolated energy transfers between an input port coupled to link 8 and one or output ports coupled to link 10. Transformer 3A has primary side windings 24A and secondary side windings 24B. Although shown with only two windings 24A and 24B, transformer 3A may have additional windings or sets of windings. For example, transformer 3A may have an auxiliary winding on primary side 7A or secondary side 5A supply a voltage or current to driver circuit 12A.

Converter unit 16 is bifurcated into two regions, primary side 7A and secondary side 5A. The portion of converter unit 16 that is coupled to primary side windings 24A (e.g., full-bridge rectifier 32, bulk capacitor 34, driver circuit 12A, switching element 14A, sense resistor 18, and filter capacitor 20) makes up primary side 7A of converter unit 16. The portion of converter unit 16 that is coupled to secondary side windings 24B (e.g., diode 36, output capacitor 34B) makes up secondary side 5A of converter unit 16.

Secondary side 5A may include diode 36, which may be used to block current from flowing from transformer 5A to other components of secondary side 5A when switching element 14A is activated, so that energy is stored in transformer 3A. Furthermore, diode 36 prevents current flow from output capacitor 34B from flowing to secondary side winding 24B and back to primary side 7A.

Switching element 14A represents any suitable combination of one or more discrete power switches, metal-oxide-semiconductor field-effect transistor (MOSFET)s, lateral power transistors, Gallium Nitride (GaN) high-electron-mobility transistor (HEMT), lateral insulated-gate bipolar transistor (IGBT), other types of transistors, or other switching elements for use in a flyback converter. For example, switching element 14A may be Gallium Nitride (GaN) or Silicon Carbide based power HEMTs. In some examples, switching element 14A may be a transistor based switching device based on wide band gap materials (e.g., GaN HEMTs, SiC MOSFETs or JFETs, etc. Converter unit 16 may include additional switches, capacitors, resistors, diodes, transformers, and/or other electrical components, elements, or circuits that are arranged within converter unit 16 to provide an output voltage at link 10 based on an input voltage at link 8.

In some examples, switching element 14A may represent a single discrete switch (e.g., a high voltage planar MOSFET, a vertical device, such as a Superjunction device, a lateral power transistor, a GaN HEMT, lateral IGBT, etc.). In some examples, switching element 14A may be a system-in-package (SIP) switching element that includes a discrete switch and a driver contained within a single package or an integrated circuit comprising power switches and driver (sometimes referred to as a System on Chip or simply "SoC") on a single chip. In some examples, switching element 14A may be a GaN based switch in combination with an additional IC that includes a start-up cell, a gate driver, current and/or voltage sense circuitry, etc. Such an IC could be a monolithic integrated circuit and/or could be manufactured using a high-voltage power IC (HV Power IC) process and technique, or other suitable manufacturing processes and techniques.

Driver circuit 12A of power converter 6A may provide command and control signals to converter unit 16 to control at what time and in what form or magnitude of output voltage that converter unit 16 provides at link 10. Driver circuit 12A may output driver signals for controlling switching element 14, based on voltage and/or current levels detected at various locations of power converter 6A.

As one example, driver circuit 12A may control switching element 14 based on an amount of current flowing through switching element 14. In the example of FIG. 2, driver circuit 12A may determine the amount of current flowing through switching element 14 based on a voltage across sense resistor 18. For example, driver circuit 12A may receive a signal at connector 28 that represents the voltage level across sense resistor 18, and determine the amount of current flowing through switching element 14A based on the resistance of sense resistor 18 and the received signal.

As another example, driver circuit 12A may control switching element 14 based on a voltage level of a supply power signal of driver circuit 12A, such as the voltage across bulk capacitor 34A and/or the voltage output by rectifier 32. For example, driver circuit 12A may receive a signal at connector 30 that represents the voltage level across sense bulk capacitor 34A, the voltage of the signal output by rectifier 32, and/or the voltage of the signal received at link 8.

Driver circuit 12A may be configured to operate converter unit 16 in a plurality of modes, such as a soft-start mode and a normal regulation mode. For instance, driver circuit 12A may initially operate converter unit 16 in the soft-start mode, and transition into operating converter unit 16 in the normal regulation mode after a period of time.

Driver circuit 12A can comprise any suitable arrangement of hardware, software, firmware, or any combination thereof, to perform the techniques attributed to driver circuit 12A herein. For example, driver circuit 12A may include any one or more microprocessors, digital signal processors (DSPs), application specific integrated circuits (ASICs), field programmable gate arrays (FPGAs), or any other equivalent integrated or discrete logic circuitry, as well as any combinations of such components. When driver circuit 12A includes software or firmware, driver circuit 12A further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components. Although not shown in FIG. 2, driver circuit 12A may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to driver circuit 12A and/or power converter 6A, e.g., may be external to a package in which driver circuit 12A and/or power converter 6A is housed.

As used throughout this disclosure, when referring to a switching element (e.g., a power switch, MOSFET, IGBT, etc.), the terms "close", "enable", "switch-on", "turn-on" and the like are used to describe when a switching element transitions from operating in a first state in which the switching element does not conduct in a forward direction, for example a forward direction across the drain and source terminals of a MOSFET) or otherwise blocks current to operating in a second state in which the switching element does conduct and does not block current in the forward direction. Conversely, as used throughout this disclosure, when referring to a switching element, the terms "open", "disable", "switch-off", "turn-off", and the like are used to describe when a switching element transitions from operating in a second state in which the switching element does conduct and does not block current to operating in a first state in which the switching element does not conduct or otherwise blocks current.

The term "cycle" is used throughout the disclosure to refer to instances in which a switching element transitions from operating in a first operating state, to operating in a second operating state, and to operating again, back in the first operating state. For example, a switching element may begin by operating in a switched-on state. The switching element may cycle by switching-off after operating in the switched-on state, and then switch back on to complete the cycle. Conversely, a switching element may start by operating in a switched-off state. The switching element may cycle by switching-on after operating in the switched-off state, and then switch back off to complete the cycle.

In operation, converter unit 6A may convert or adapt power received from supply 2 and provide the converted or adapted power to load 4. Converter unit 6A may receive a voltage or draw a current at link 8 and convert the voltage or current at link 8 into a suitable voltage or current at link 10 for powering load 4.

Figure 3A:
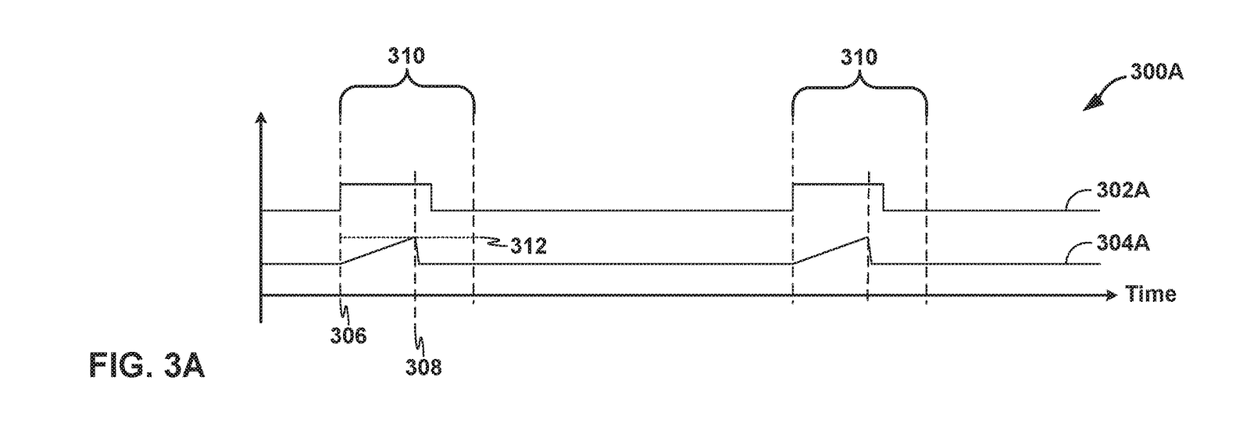
FIGS. 3A and 3B are graphs illustrating various signals of an example circuit for controlling a power converter, in accordance with one or more techniques of this disclosure.
Figure 3B:
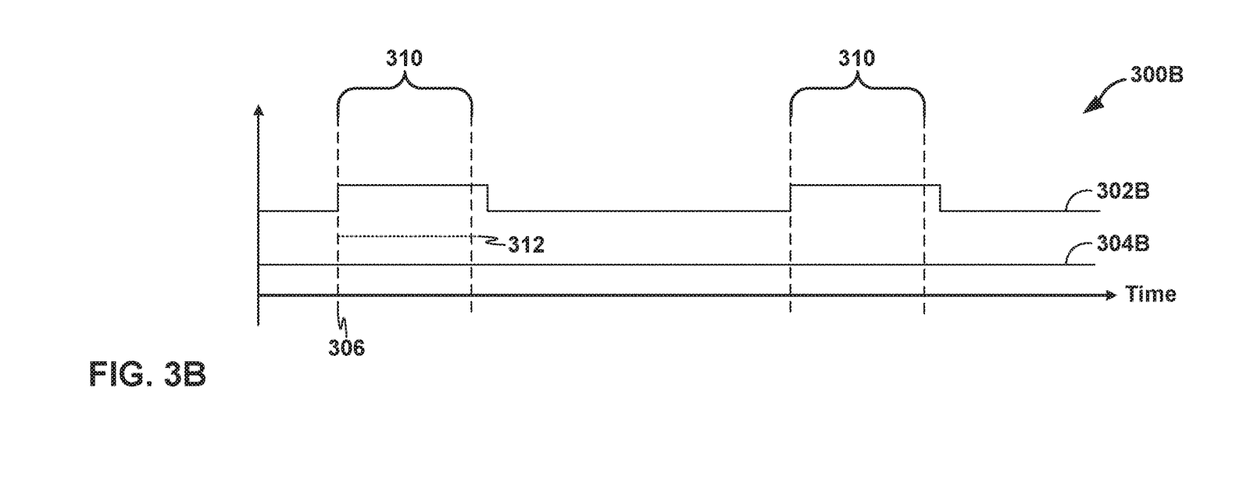

FIGS. 3A and 3B are graphs illustrating various signals of an example circuit for controlling a power converter, in accordance with one or more techniques of this disclosure. As illustrated in FIGS. 3A and 3B, graphs 300A and 300B (collectively "graphs 300") may include a horizontal axis representing time, and respective plots of plot 302A and 302B (collectively "plots 302"), and plots 304A and 304B (collectively "plots 304"). Plots 302 may each represent the activation state of a switching element, such as switching element 14A of FIG. 2. Plots 304 may represent a signal that represents an amount of current flowing through the switching element, such as the signal received at input connector 28 of driver circuit 12A of FIG. 2.

Referring now to FIGS. 2, 3A, and 3B, to cause converter unit 6A to convert or adapt power received from supply 2 and provide the converted or adapted power to load 4, driver circuit 12A may activate switching element 14A to transfer energy from supply 2 to transformer 3A. For instance, driver circuit 12A may output, at time 306, a signal via output connector 26 that causes switching element 14A to close.

When switching element 14A is closed, the amount of current flowing through switching element 14A may begin to increase. Driver circuit 12A may monitor the amount of current flowing through switching element 14A. As discussed above, driver circuit 12A may receive a signal at connector 28 that represents the voltage level across sense resistor 18, and determine the amount of current flowing through switching element 14A based on the resistance of sense resistor 18 and the received signal.

Responsive to determining that the amount of current flowing through switching element 14A is greater than or equal to a threshold amount of current, driver circuit 12A may deactivate switching element 14A. In some examples, driver circuit 12A may determine the threshold amount of current based on a desired voltage level or current level to be provided to load 4. As shown in FIG. 3A, switching element 14A is deactivated in response to the amount of current flowing through switching element 14A (represented by plot 304A) becoming greater than or equal to threshold amount of current 312 at time 308.

However, in some situations, driver circuit 12A may not be able to accurately monitor the amount of current flowing through switching element 14A. For instance, as shown in FIG. 3B, if connector 28 is shorted to ground, driver circuit 12A may not be able to accurately monitor the amount of current flowing through switching element 14A. As discussed above, it may not be desirable for switching element 14A to be activated where driver circuit 12A is not be able to accurately monitor the amount of current flowing through switching element 14A.

In accordance with one or more techniques of this disclosure, driver circuit 12A may deactivate switching element 14A in response to determining that driver circuit 12A is not able to accurately monitor the amount of current flowing through switching element 14A. In some examples, driver circuit 12A may determine that it is not able to accurately monitor the amount of current flowing through switching element 14A in response to switching element 14 being activated for longer than expected. For instance, driver circuit 12A may determine an amount of time elapsed since switching element 14A was activated. Under normal operating conditions, as shown in FIG. 3A, the amount of current flowing through switching element 14A will satisfy threshold amount of current 312 before switching element 14A is activated for longer than threshold amount of time 310, driver circuit 12A may deactivate switching element 14A. However, if the amount of time elapsed is longer than a threshold amount of time, driver circuit 12A may determine that it is not able to accurately monitor the amount of current flowing through switching element 14A. As shown in FIG. 3B, driver circuit 12A may deactivate switching element 14A because the amount of current flowing through switching element 14A does not satisfy threshold amount of current 312 before switching element 14A is activated for longer than threshold amount of time 310. In this way, driver circuit 12A may protect switching element 14A and/or other components from damage, which may increase an operation life of the components and/or reduce the risk of fires.

In some examples, driver circuit 12A may use a fixed amount of time as the threshold amount of time. In some examples, driver circuit 12A may adapt the threshold amount of time based on one or more parameters of converter unit 6A.

As discussed above, in some examples, driver circuit 12A may operate converter unit 6A in a plurality of modes, such as a soft-start mode and a normal regulation mode. In some examples, driver circuit 12A may use different threshold amounts of time for the soft-start mode and the normal regulation mode. For instance, driver circuit 12A may use a fixed amount of time (e.g., 0.5 microseconds, 1 microsecond, 1.5 microseconds, 5 microseconds, etc.) as a soft-start threshold amount of time and a dynamically adjusted amount of time as a normal regulation threshold amount of time. In some examples, driver circuit 12A may determine the normal regulation threshold amount of time based on a voltage across a bulk capacitor, such as bulk capacitor 34A. In some examples, driver circuit 12A may determine the normal regulation threshold amount of time based on a voltage across a bulk capacitor and one or more parameters of the soft-start mode, such as an amount of time that switching element 14 is activated during a particular cycle of the soft-start mode (e.g., a first cycle of the soft-start mode).

Figure 4:
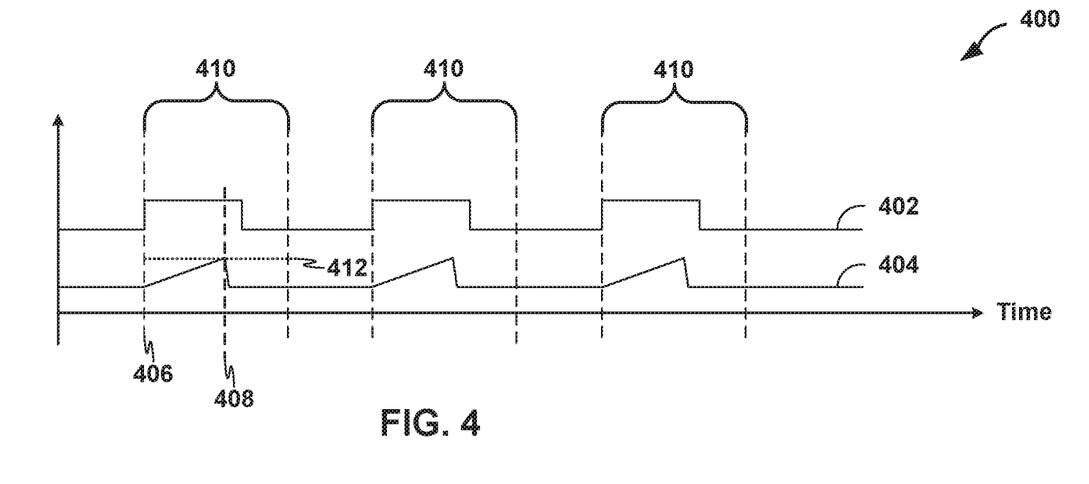
FIG. 4 is a graph illustrating various signals of an example circuit for controlling a power converter, in accordance with one or more techniques of this disclosure.

FIG. 4 is a graph illustrating various signals of an example circuit for controlling a power converter, in accordance with one or more techniques of this disclosure. As illustrated in FIG. 4, graph 400 may include a horizontal axis representing time, plot 402, and plot 404. Plots 402 may represent the activation state of a switching element, such as switching element 14A of FIG. 2. Plot 404 may represent a signal that represents an amount of current flowing through the switching element, such as the signal received at input connector 28 of driver circuit 12A of FIG. 2.

As discussed above, driver circuit 12A may use a fixed amount of time (e.g., 0.5 microseconds, 1 microsecond, 1.5 microseconds, 5 microseconds, etc.) as a soft-start threshold amount of time. In some examples, while operating in the soft-start mode, driver circuit 12A may protect the system from damage (i.e., by deactivating switching element 14A) in response to switching element 14A remaining activated for longer than the soft-start threshold amount of time in a single cycle. In some examples, while operating in the soft-start mode, driver circuit 12A may protect the system from damage in response to switching element 14A remaining activated for longer than the soft-start threshold amount of time in a threshold number of cycles (e.g., 2 cycles, 3 cycles, 4, cycles, 5 cycles, etc.). For instance, if switching element 14A remains activated for longer than the soft-start threshold amount of time for the threshold number of cycles, driver circuit 12A may determine that it cannot accurately monitor the amount of current flowing through switching element 14A and take action to protect the system from damage (i.e., by deactivating switching element 14A).

Figure 5:
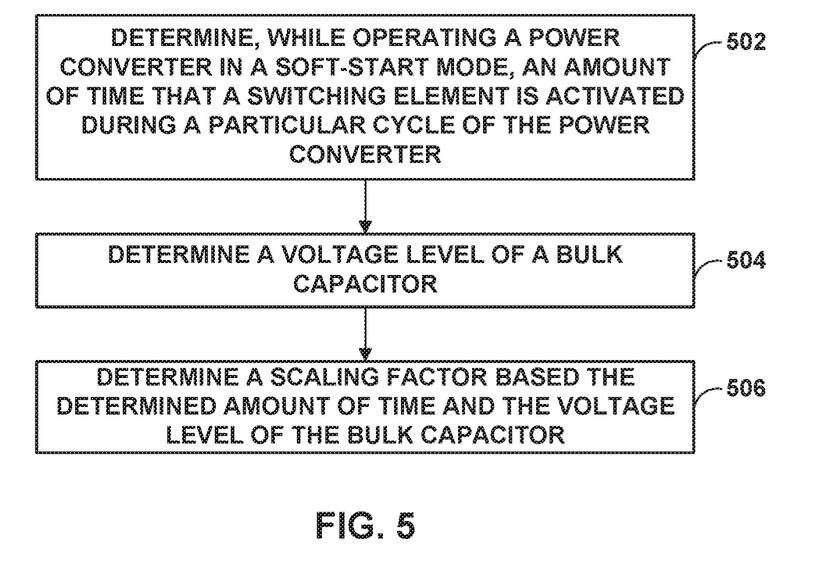
FIG. 5 is a flowchart illustrating example operations of a circuit for controlling a power converter, in accordance with one or more techniques of this disclosure.

FIG. 5 is a flowchart illustrating example operations of a circuit for controlling a power converter, in accordance with one or more techniques of this disclosure. For purposes of illustration, the techniques of FIG. 5 are described within the context of power converter 6 of FIGS. 1-2 although power converters having configurations different than that of power converter 6 may perform the techniques of FIG. 5.

In some examples, it may be desirable for the threshold amount of time to be robust and adjustable as the deviation for the current pass-through of switching element 14 during high line and low line could very large. In accordance with one or more techniques of this disclosure and as discussed above, driver circuit 12 may determine the normal regulation threshold amount of time based on a voltage across a bulk capacitor and one or more parameters of the soft-start mode. In some examples, driver circuit 12 may determine the normal regulation threshold amount of time in accordance with Equation (1), below:

$$TONmax(t)=(V_{cs\text{-}max}/R_{sense})*L/VBULK*1.5 \quad (1)$$

Where:
$V_{cs\text{-}max}$: the largest voltage that CS pin could see.
$R_{sense}$: the size of the sense resistor.
L: the size of main inductor.
1.5: a constant tolerance margin (which may be changed based on system needs).

In simpler terms, Equation (1) can be rearranged into Equation (2), below:

$$TONmax(\text{e.g., a time which may be measured as a number of cpu cycles})=TONmax\_GAIN/VBULK \quad (2)$$

Where:
TONmax_GAIN=$(V_{cs\text{-}max}/R_{sense})*L*1.5/CPU\_PERIOD$ (2)
CPU_PERIOD: the clock period of a processor of driver circuit 12; or TONmax_GAIN=$(V_{cs\text{-}max}/R_{sense})*L*1.5$
In an example use case where $V_{cs\text{-}max}$=−0.6V, $R_{sense}$=0.19 ohms, L=180 uH, and the CPU clock period=15.8 ns, TONmax_GAIN may be 53964. In another example use case where $V_{cs\text{-}max}$=0.6V, $R_{sense}$=0.19 ohms, and L=180 uH (i.e., using the second equation for TONmax_GAIN without reference to CPU_PERIOD), TONmax_GAIN may be 5.684*10e-04. As TONmax_GAIN (i.e., a scaling factor) is system dependent, this disclosure proposes a one-time auto-calibration during startup to calculate TONmax_GAIN for subsequent use in the normal regulation mode. For instance, TONmax_GAIN may be calculated in accordance with Equation (3), below, which is based off of Equation (1) above.

$$TON(\text{No. of cpu cycles})=(V_{cs\text{-}fix}/R_{sense})*L/(VBULK*CPU\_PERIOD); \text{ or}$$

$$TON(t)=(V_{cs\text{-}fix}/R_{sense})*L/VBULK \quad (3)$$

Where:
$V_{cs\text{-}fix}$: $V_{cs\text{-}fix}<V_{cs\text{-}max}$; $V_{cs\text{-}fix}*N=V_{cs\text{-}max}$. $V_{cs\text{-}fix}$ is a fixed chosen value.

TON: Measured time using hardware method, such as a register in driver circuit 12A.
VBULK: Measured Bulk voltage at connector 30 of driver circuit 12A
From Equation (3), Equation (4), below, may be derived.

$$TON(\text{No. of cpu cycles})*VBULK=(V_{cs\text{-}fix}/R_{sense})*L/CPU\_PERIOD; \text{ or}$$

$$TON(t)*VBULK=(V_{cs\text{-}fix}/R_{sense})*L \quad (4)$$

By letting TONmax_GAIN=$N*(V_{cs\text{-}fix}/R_{sense})*L/CPU\_PERIOD$ or letting TONmax_GAIN=$N*(V_{cs\text{-}fix}/R_{sense})*L$, TONmax_GAIN may be substituted into Equation (4) to yield Equation (5), below.

$$TONmax\_GAIN=N*TON(\text{No. of cpu cycles})*VBULK \quad TONmax\_GAIN=N*TON(t)*VBULK \quad (5)$$

In operation, driver circuit 12 may determine, while operating power converter 6 in a soft-start mode, an amount of time that switching element 14 is activated during a particular cycle of power converter 6 (502). For instance, driver circuit 12 may determine an amount of time that switching element 14 is activated during a first cycle of a soft-start of power converter 6. Driver circuit 12 may measure a voltage level of a bulk capacitor (504). For instance, driver circuit 12A may measure a voltage level across capacitor 34A via connector 30. Driver circuit 12 may determine a scaling factor based on the determined amount of time and the voltage level of the bulk capacitor (506). For instance, driver circuit 12 may determine TONmax_GAIN in accordance with Equation (5), above. In this way, TONmax_GAIN can be auto calibrated by using the TON time captured and bulk capacitor voltage measurement during the first switching gate pulse and stored to be used during normal regulation.

In some examples, it may be desirable to determine whether or not driver circuit 12 is able to accurately measure the amount of current flowing through switching element 14 as fast as possible. In accordance with one or more techniques of this disclosure, driver circuit 12 may measure an amount of current flowing through switching element 14 at a particular point in time during a cycle of power converter 6. If the measurement of the amount of current performed by driver circuit 12 is less than or equal to a fraction of the threshold amount of current, driver circuit 12 may determine that it is not able to accurately measure the amount of current flowing through switching element 14 and deactivate switching element 14 before switching element 14 was expected to be deactivated. In some examples, the fraction of the threshold amount of current may be half of the threshold amount of current and the particular point in time during the cycle may be halfway through the cycle.

To measure the amount of current flowing through switching element 14 at a particular point in time during a cycle of power converter 6, driver circuit may determine an amount of time for which switching element 14 is expected to be on during the cycle. In some examples, an amount of time for which switching element 14 is expected to be on during a cycle based on one or more of: a scaling factor determined during soft-start (e.g., LR_GAIN), a voltage across bulk capacitor 34A, and the threshold amount of current.

Driver circuit 12 may determine scaling factor LR_GAIN in a manner similar to TONmax_GAIN. For instance, LR_GAIN may be defined as:

$$LR\_GAIN=L/(R_{sense}*CPU\_PERIOD); \text{ or}$$

$$LR\_GAIN=L/(R_{sense})$$

Substituting LR_GAIN into Equation (4) may result in:

$$LR\_GAIN = TON(\text{No. of cpu cycles}) * VBULK/V_{cs\text{-}fix};$$
or
$$LR\_GAIN = TON(t) * VBULK/V_{cs\text{-}fix}$$

In some examples, LR_GAIN can be auto calibrated based on the amount of time that switching element 14 is activated during a particular cycle of the soft-start of power converter 6A (e.g., the first cycle) and bulk capacitor voltage measurements during the particular cycle of the soft-start of power converter 6A. $V_{cs\text{-}fix}$ may be a fix variable that is used by driver circuit 12 for soft-start. Driver circuit 12 may store LR_GAIN for subsequent use during the normal operating mode.

During cycle by cycle switching in the normal operating mode, driver circuit 12 may determine the amount of time for which switching element 14 is expected to be active in accordance with Equation (6), below.

$$TON(\text{no. of cpu cycles}) = LR\_GAIN * V_{cs\text{-}ocp1}/VBULK;\text{ or}$$

$$TON(t) = LR\_GAIN * V_{cs\text{-}ocp1}/VBULK \quad (6)$$

Where:
$V_{cs\text{-}ocp1}$: The peak current setting for the switching cycle

Using the determined amount of time for which switching element 14 is expected to be active, driver circuit 12 may perform a measurement of the amount of current flowing through switching element 14 at a particular point in time during the cycle of converter 6. For instance, driver circuit 12 may perform a measurement of the amount of current flowing through switching element 14 halfway through the cycle of converter 6 (i.e., 50% of the amount of time for which switching element 14 is expected to be on during the cycle).

If the measured amount of current flowing through switching element 14 at the particular point in time during the cycle is less than or equal to a fraction of the threshold amount of current (e.g., 25%, 50%, 75% of the threshold amount of current), driver circuit 12 may determine that it is not able to accurately measure the amount of current flowing through switching element 14 and deactivate switching element 14 before switching element 14 was expected to be deactivated.

Figure 6:
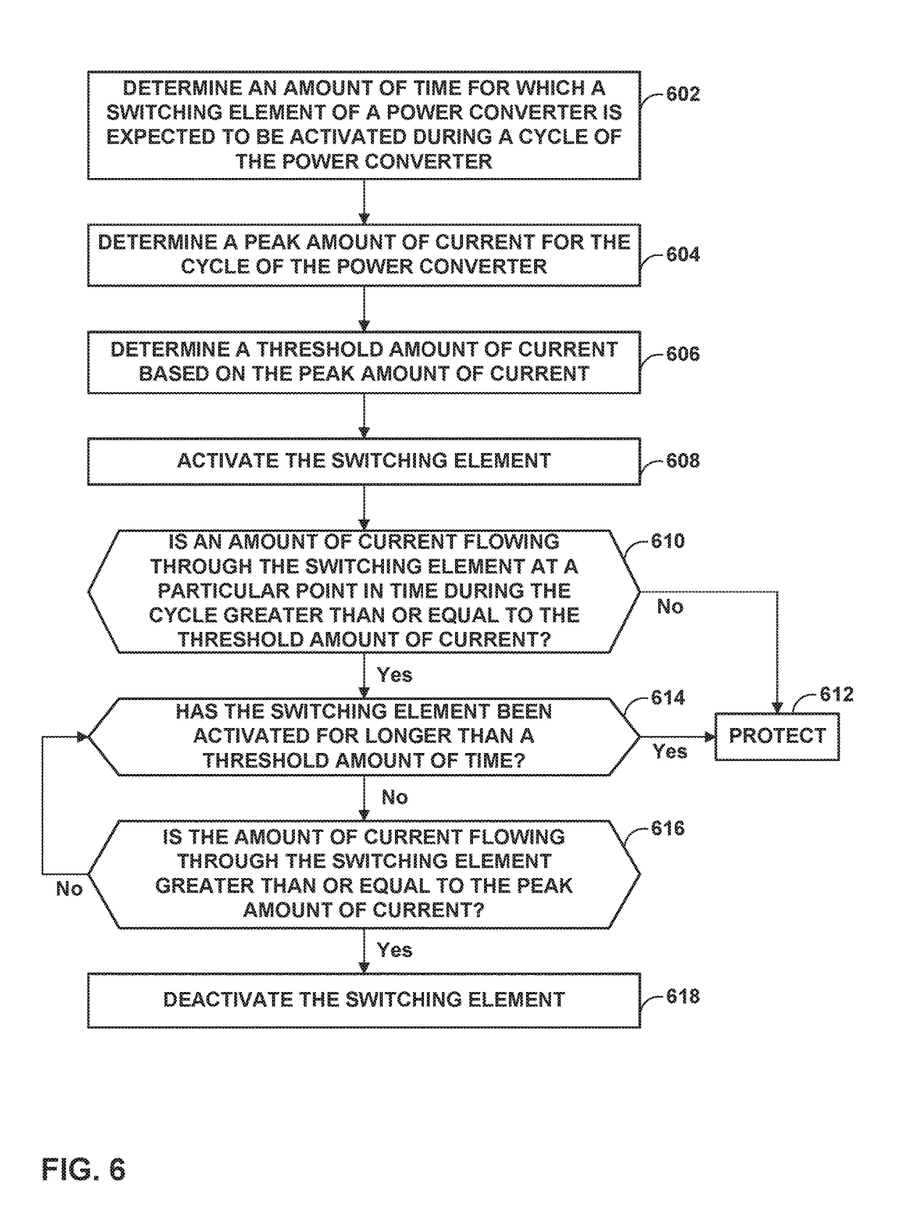
FIG. 6 is a flowchart illustrating example operations of a circuit for controlling a power converter, in accordance with one or more techniques of this disclosure.

FIG. 6 is a flowchart illustrating example operations of a circuit for controlling a power converter, in accordance with one or more techniques of this disclosure. For purposes of illustration, the techniques of FIG. 6 are described within the context of power converter 6 of FIGS. 1-2 although power converters having configurations different than that of power converter 6 may perform the techniques of FIG. 6.

In accordance with one or more techniques of this disclosure, driver circuit 12 may determine an amount of time for which switching element 14 of power converter 6 is expected to be activated during a cycle of power converter 6 (602). In some examples, driver circuit 12 may determine the expected amount of time (TON) based on one or more measurements performed during a soft-start of power converter 6. For instance, driver circuit 12 may determine the expected amount of time in accordance with Equation (6), above.

Driver circuit 12 may determine a peak amount of current for the cycle of the power converter (604). In some examples, driver circuit 12 may receive a voltage signal that indicates the amount of current flowing through switching element 14. As such, in some examples, driver circuit 12 may determine a voltage level that corresponds to the peak amount of current (Vcs-ocp1). Driver circuit 12 may determine the peak amount of current based on a frequency law table. For instance, driver circuit 12 may look up the voltage level that corresponds to the peak amount of current (Vcs-ocp1) in a frequency law table.

Driver circuit 12 may determine a threshold amount of current based on the determined peak amount of current (606). In some examples, driver circuit 12 may determine the threshold amount of current as a fraction of the determined peak amount of current. For instance, driver circuit 12 may determine the threshold amount of current as half of the determined peak amount of current. In some examples, driver circuit 12 may determine a voltage level that represents the threshold amount of current. For instance, where the fraction is one-half, driver circuit 12 may determine the voltage level that represents the threshold amount of current as one-half the voltage level that corresponds to the peak amount of current (i.e., 0.5*Vcs-ocp1).

Driver circuit 12 may activate the switching element (608). For instance, driver circuit 12 may output a signal via connector 26 that causes switching element 14 to close. As discussed above, when switching element 14 is closed, energy may be transferred from power source 8 to transformer 3.

Driver circuit 12 may monitor the amount of current flowing through switching element 14. For instance, an input of driver circuit 12, such as connector 28, may receive a voltage signal that corresponds to a voltage across a sense resistor, such as sense resistor 18, which in-turn corresponds to the amount of current flowing through switching element 14.

Driver circuit 12 may determine whether the amount of current flowing through the switching element at a particular point in time during the cycle is greater than or equal to the determined threshold amount of current (610). For instance, driver circuit 12 may determine whether a level of the received voltage signal at connector 28 at a point in time that is half of the amount of time for which switching element 14 of power converter 6 is expected to be activated during the cycle of power converter 6 is greater than or equal to the voltage level that represents the threshold amount of current.

If the amount of current flowing through the switching element at the particular point in time during the cycle is less than to the determined threshold amount of current ("No" branch of 610), driver circuit 12 may perform one or more actions to protect power converter 6 (612). For instance, driver circuit 12 may deactivate switching element 14. In this way, driver circuit 12 may protect power converter 6 from damage in advance of when switching element 14 is expected to be deactivated.

If the amount of current flowing through the switching element at the particular point in time during the cycle is greater than or equal to the determined threshold amount of current ("Yes" branch of 610), driver circuit 12 may determine whether switching element 14 has been activated for longer than a threshold amount of time (614). As discussed above, in some examples, driver circuit 12 may determine the threshold amount of time based on one or both of: a scaling factor determined another cycle of the power converter (e.g., a scaling factor based on an amount of time that switching element 14 was activated during a cycle of a soft-start (e.g., TONmax_GAIN)), and a voltage level of a bulk capacitor of power converter 6, such as bulk capacitor 34A. For instance, driver circuit 12 may determine the threshold amount of time in accordance with Equation (2), above.

If switching element 14 has been activated for longer than the threshold amount of time ("Yes" branch of 614), driver circuit 12 may perform one or more actions to protect power converter 6 (612). For instance, driver circuit 12 may deactivate switching element 14. In this way, driver circuit 12 may protect power converter 6 from damage.

If switching element 14 has not been activated for longer than the threshold amount of time ("No" branch of 614), driver circuit 12 may determine whether an amount of current flowing through switching element 14 is greater than or equal to the determined peak amount of current (616). If the amount of current flowing through switching element 14 is greater than or equal to the determined peak amount of current ("Yes" branch of 616), driver circuit 12 may deactivate switching element 14 (618). If the amount of current flowing through switching element 14 is less than the determined peak amount of current ("No" branch of 616), driver circuit 12 may continue to determine whether switching element 14 has been activated for longer than the threshold amount of time (614) and determine whether the amount of current flowing through switching element 14 is greater than or equal to the determined peak amount of current (616). In this way, driver circuit 12 may protect power converter 6 from damage.

The following numbered examples may illustrate one or more aspects of the disclosure:

Example 1

A method comprising: activating, by a controller of a power converter, a switch of the power converter that controls an amount of energy provided by the power converter; receiving, by an input of the controller, a signal that represents an amount of current flowing through the switch; responsive to determining that the amount of current flowing through the switch is greater than or equal to a threshold amount of current, deactivating, by the controller, the switch; and responsive to determining that an amount of time elapsed since activation of the switch is greater than a threshold amount of time, deactivating, by the controller, the switch.

Example 2

The method of example 1, wherein the controller is configured to operate the power converter in a soft-start mode or a normal regulation mode, and wherein deactivating the switch comprises: responsive to determining, by the controller and while operating the power converter in the soft-start mode, that an amount of time elapsed since activation of the switch is greater than a soft-start threshold amount of time, deactivating, by the controller, the switch; and responsive to determining, by the controller and while operating the power converter in the normal regulation mode, that an amount of time elapsed since activation of the switch is greater than a normal regulation threshold amount of time, deactivating, by the controller, the switch.

Example 3

The method of example 2, wherein the soft-start threshold amount of time is a fixed amount of time.

Example 4

The method of any combination of examples 1-3, wherein the input is a first input, the method further comprising: receiving, by a second input of the controller, a signal that represents a voltage level of a supply power signal of the converter; and determining, based on the voltage level of the supply power signal, the normal regulation threshold amount of time.

Example 5

The method of any combination of examples 1-4, further comprising: determining, by the controller and while operating the power converter in the soft-start mode, an amount of time that the switch is activated during a particular cycle of the power converter, wherein determining the normal regulation threshold amount of time comprises: determining, based on the voltage level of the supply power signal and the amount of time that the switch was activated during the particular cycle of the power converter, the normal regulation threshold amount of time.

Example 6

The method of any combination of examples 1-5, wherein the normal regulation threshold amount of time represents a duration of time that is longer than an amount of time the switch is expected to be activated during a single cycle of the power converter.

Example 7

The method of any combination of examples 1-6, wherein the threshold amount of current is a first threshold amount of current, the method further comprising: determining, based on the first threshold amount of current, a second threshold amount of current that is less than the first threshold amount of current; and responsive to determining that the amount of current flowing through the switch at a particular point in time during a cycle of the power converter is less than or equal to the second threshold amount of current, deactivating, by the controller, the switch.

Example 8

The method of any combination of examples 1-7, wherein the particular point in time during the cycle is halfway through the cycle, and wherein the second threshold amount of current comprises half of the first threshold amount of current.

Example 9

A device for controlling a power converter, the device comprising: an output connector configured to output a signal to control activation of a switch of the power converter, wherein the switch controls an amount of energy provided by the power converter; an input configured to receive a signal that represents an amount of current flowing through the switch; one or more processors configured to: output, via the output connector, a signal to activate the switch; determine, based on the signal received by the input connector, an amount of current flowing through the switch; responsive to determining that the amount of current flowing through the switch is greater than or equal to a threshold amount of current, output, via the output connector, a signal to deactivate the switch; and responsive to determining that an amount of time elapsed since activation of the switch is greater than a threshold amount of time, output, via the output connector, a signal to deactivate the switch.

Example 10

The device of example 9, wherein the one or more processors are configured to: operate the power converter in a soft-start mode or a normal regulation mode; responsive to determining, while operating the power converter in the soft-start mode, that an amount of time elapsed since activation of the switch is greater than a soft-start threshold amount of time, output, via the output connector, the signal to deactivate the switch; and responsive to determining, while operating the power converter in the normal regulation mode, that an amount of time elapsed since activation of the switch is greater than a normal regulation threshold amount of time, output, via the output connector, the signal to deactivate the switch.

Example 11

The device of example 10, wherein the soft-start threshold amount of time is a fixed amount of time.

Example 12

The device of any combination of examples 9-11, wherein the input is a first input, the device further comprising: a second input configured to receive signal that represents a voltage level of a supply power signal of the converter, and wherein the one or more processors are configured to: determine, based on the voltage level of the supply power signal, the normal regulation threshold amount of time.

Example 13

The device of any combination of examples 9-12, wherein the one or more processors are configured to: determine, while operating the power converter in the soft-start mode, an amount of time that the switch is activated during a particular cycle of the power converter, wherein, to determine the normal regulation threshold amount of time, the one or more processors are configured to: determine, based on the voltage level of the supply power signal and the amount of time that the switch was activated during the particular cycle of the power converter, the normal regulation threshold amount of time.

Example 14

The device of any combination of examples 9-13, wherein the normal regulation threshold amount of time represents a duration of time that is longer than an amount of time the switch is expected to be activated during a single cycle of the power converter.

Example 15

The device of any combination of examples 9-14, wherein the threshold amount of current is a first threshold amount of current, and wherein the one or more processors are configured to: determine, based on the first threshold amount of current, a second threshold amount of current that is less than the first threshold amount of current; and responsive to determining that the amount of current flowing through the switch at a particular point in time during a cycle of the power converter is less than or equal to the second threshold amount of current, output, via the output connector, the signal to deactivate the switch.

Example 16

The device of any combination of examples 9-15, wherein the particular point in time during the cycle is halfway through the cycle, and wherein the second threshold amount of current comprises half of the first threshold amount of current.

Example 17

A device comprising means for performing the method of any combination of examples 1-8.

Example 18

A computer-readable storage medium storing instructions that, when executed, cause one or more processors of a device for controlling a power converter to perform the method of any combination of examples 1-8.

Various examples of the invention have been described. These and other examples are within the scope of the following claims.

The invention claimed is:

1. A method comprising:
    activating, by a controller of a power converter, a switch of the power converter that controls an amount of energy provided by the power converter;
    receiving, by an input of the controller, a signal that represents an amount of current flowing through the switch;
    responsive to determining that the amount of current flowing through the switch is greater than or equal to a threshold amount of current, deactivating, by the controller, the switch; and
    responsive to determining that an amount of time elapsed since activation of the switch is greater than a threshold amount of time, deactivating, by the controller, the switch, wherein the threshold amount of time represents a duration of time that is longer than an amount of time the switch is expected to be activated during a single cycle of the power converter.

2. The method of claim 1, wherein the controller is configured to operate the power converter in a soft-start mode or a normal regulation mode, wherein the threshold amount of time is a normal regulation threshold amount of time, and wherein deactivating the switch comprises:
    responsive to determining, by the controller and while operating the power converter in the soft-start mode, that an amount of time elapsed since activation of the switch is greater than a soft-start threshold amount of time, deactivating, by the controller, the switch; and
    responsive to determining, by the controller and while operating the power converter in the normal regulation mode, that an amount of time elapsed since activation of the switch is greater than the normal regulation threshold amount of time, deactivating, by the controller, the switch.

3. The method of claim 2, wherein the soft-start threshold amount of time is a fixed amount of time.

4. The method of claim 2, wherein the input is a first input, the method further comprising:
    receiving, by a second input of the controller, a signal that represents a voltage level of a supply power signal of the converter; and determining, based on the voltage level of the supply power signal, the normal regulation threshold amount of time.

5. The method of claim 4, further comprising:
determining, by the controller and while operating the power converter in the soft-start mode, an amount of time that the switch is activated during a particular cycle of the power converter, wherein determining the normal regulation threshold amount of time comprises:
determining, based on the voltage level of the supply power signal and the amount of time that the switch was activated during the particular cycle of the power converter, the normal regulation threshold amount of time.

6. The method of claim 2, wherein the threshold amount of current is a first threshold amount of current, the method further comprising:
determining, based on the first threshold amount of current, a second threshold amount of current that is less than the first threshold amount of current; and
responsive to determining that the amount of current flowing through the switch at a particular point in time during a cycle of the power converter is less than or equal to the second threshold amount of current, deactivating, by the controller, the switch.

7. The method of claim 6, wherein the particular point in time during the cycle is halfway through the cycle, and wherein the second threshold amount of current comprises half of the first threshold amount of current.

8. A device for controlling a power converter, the device comprising:
an output connector configured to output a signal to control activation of a switch of the power converter, wherein the switch controls an amount of energy provided by the power converter;
an input configured to receive a signal that represents an amount of current flowing through the switch; and
one or more processors configured to:
overate the power converter in a soft-start mode or a normal regulation mode;
output, via the output connector, a signal to activate the switch;
determine, based on the signal received by the input connector, an amount of current flowing through the switch;
responsive to determining that the amount of current flowing through the switch is greater than or equal to a threshold amount of current, output, via the output connector, a signal to deactivate the switch;
responsive to determining, while operating the power converter in the soft-start mode, that an amount of time elapsed since activation of the switch is greater than a soft-start threshold amount of time, output, via the output connector, a signal to deactivate the switch; and
responsive to determining, while operating the power converter in the normal regulation mode, that an amount of time elapsed since activation of the switch is greater than a normal regulation threshold amount of time, output, via the output connector, the signal to deactivate the switch.

9. The device of claim 8, wherein the soft-start threshold amount of time is a fixed amount of time.

10. The device of claim 8, wherein the input is a first input, the device further comprising:
a second input configured to receive signal that represents a voltage level of a supply power signal of the converter, and wherein the one or more processors are configured to:
determine, based on the voltage level of the supply power signal, the normal regulation threshold amount of time.

11. The device of claim 10, wherein the one or more processors are configured to:
determine, while operating the power converter in the soft-start mode, an amount of time that the switch is activated during a particular cycle of the power converter, wherein, to determine the normal regulation threshold amount of time, the one or more processors are configured to:
determine, based on the voltage level of the supply power signal and the amount of time that the switch was activated during the particular cycle of the power converter, the normal regulation threshold amount of time.

12. The device of claim 8, wherein the normal regulation threshold amount of time represents a duration of time that is longer than an amount of time the switch is expected to be activated during a single cycle of the power converter.

13. The device of claim 8, wherein the threshold amount of current is a first threshold amount of current, and wherein the one or more processors are configured to:
determine, based on the first threshold amount of current, a second threshold amount of current that is less than the first threshold amount of current; and
responsive to determining that the amount of current flowing through the switch at a particular point in time during a cycle of the power converter is less than or equal to the second threshold amount of current, output, via the output connector, the signal to deactivate the switch.

14. The device of claim 13, wherein the particular point in time during the cycle is halfway through the cycle, and wherein the second threshold amount of current comprises half of the first threshold amount of current.

15. A device for controlling a power converter, the device comprising:
means for activating a switch of a power converter that controls an amount of energy provided by the power converter;
means for receiving a signal that represents an amount of current flowing through the switch;
means for deactivating the switch in response to determining that the amount of current flowing through the switch is greater than or equal to a threshold amount of current; and
means for deactivating the switch in response to determining that an amount of time elapsed since activation of the switch is greater than a threshold amount of time, wherein the threshold amount of time represents a duration of time that is longer than an amount of time the switch is expected to be activated during a single cycle of the power converter.

16. The device of claim 15, wherein the threshold amount of time is a normal regulation threshold amount of time, further comprising:
means for operating the power converter in a soft-start mode or a normal regulation mode; and wherein the means for deactivating the switch comprise:
means for deactivating the switch in response to determining, while operating the power converter in the soft-start mode, that an amount of time elapsed since activation of the switch is greater than a soft-start threshold amount of time; and means for deactivating the switch in response to determining, while operating the power converter in the normal regulation mode, that an amount of time elapsed since activation of the switch is greater than the normal regulation threshold amount of time.

17. The device of claim 16, further comprising:

means for receiving a signal that represents a voltage level of a supply power signal of the converter; and means for determining, based on the voltage level of the supply power signal, the normal regulation threshold amount of time.

18. The device of claim 16, wherein the threshold amount of current is a first threshold amount of current, the device further comprising:

means for determining, based on the first threshold amount of current, a second threshold amount of current that is less than the first threshold amount of current; and means for deactivating the switch in response to determining that the amount of current flowing through the switch at a particular point in time during a cycle of the power converter is less than or equal to the second threshold amount of current.

* * * * *